C. W. OLSON.
COMBINED SNAP HOOK AND SWIVEL.
APPLICATION FILED APR. 15, 1910.

963,931.

Patented July 12, 1910.

Witnesses
Ida M. Fallon
M. Garrett Howe

Inventor
C. W. Olson
By J. E. Howe
Attorney

UNITED STATES PATENT OFFICE.

CHARLES W. OLSON, OF RAINIER, OREGON.

COMBINED SNAP-HOOK AND SWIVEL.

963,931.  Specification of Letters Patent.  Patented July 12, 1910.

Application filed April 15, 1910. Serial No. 555,567.

*To all whom it may concern:*

Be it known that I, CHARLES W. OLSON, a citizen of the United States, residing at Rainier, in the county of Columbia and State of Oregon, have invented certain new and useful Improvements in Combination Snap-Hooks and Swivels, of which the following is a specification.

This invention is a combined snap hook and swivel adapted for use in logging, construction work and other heavy work.

The object of the invention is to provide a simple and practical device of this character which will serve both as a swivel and a self-locking snap hook, the construction being such that a ring, chain, cable or the like may be quickly and easily engaged with or disengaged from the hook, and when engaged will be effectively locked so that it cannot possibly work out of the hook.

Figure 1:
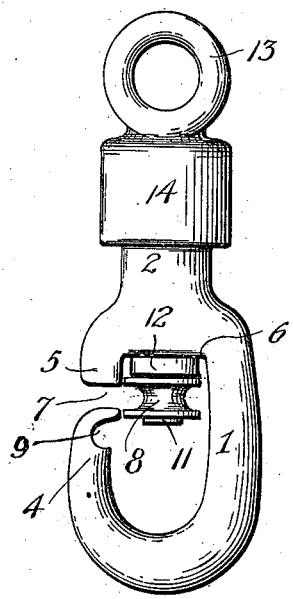
Figure 2:
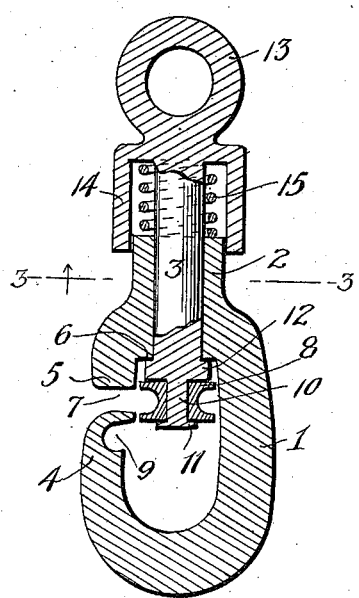
Figure 3:
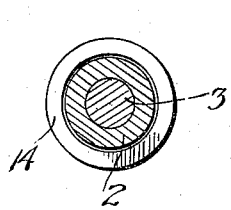
Figure 4:
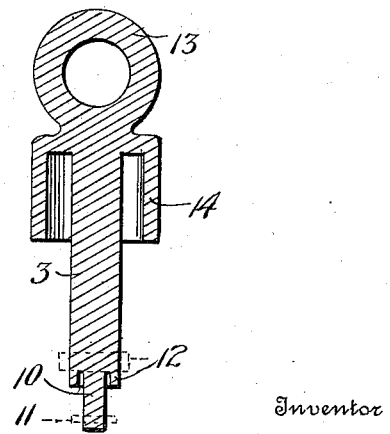

With the above and other objects in view, the invention consists in the novel combination and arrangement of parts and the details of construction, hereinafter described and claimed, and illustrated in the accompanying drawing in which:

Figure 1 is a side view of the preferred embodiment of my invention; Fig. 2 is a sectional view through the same; Fig. 3 is a cross-sectional view taken on line 3—3 in Fig. 2; and Fig. 4 is a sectional view through the stem or pin before it is inserted in the tubular shank of the hook.

In the drawing, 1 denotes the body of the hook which is formed with a tubular cylindrical shank 2 adapted to receive a cylindrical swivel pin or stem 3. The bill 4 of the hook is arranged on one side of the body 1 and close to a guard lug 5 which projects from the flat inner end 6 in the hook opening and thereby provides a contracted mouth 7 for the hook.

The stem 3 is adapted to rotate in the shank 2 to permit the device to be used as a swivel connection, and said shank is also adapted to have a limited sliding movement in order to move a grooved locking roller 8 between the mouth 7 of the hook and a transverse notch or seat 9 formed in the inner face of the bill 4. The roller is journaled on a reduced lower end or pivot 10 on the stem 3 and is retained thereon by upsetting or heading said pivot as shown at 11. The stem is likewise retained in the shank 2 by upsetting or heading its lower portion 12 to form a flange or head which engages the flat end 6 of the opening in the body of the hook.

The upper or outer end of the stem 3 carries an eye 13 or other means for attaching it to a cable, chain, etc., and the said end of the stem also carries a cylindrical sleeve 14 which telescopes the shank 2 and serves as a casing for a coil spring 15. This spring surrounds the stem 3 and bears against the end of the shank 2 for the purpose of holding the locking roller 8 opposite the mouth 7 of the hook and thereby preventing the accidental disengagement of the ring, chain or cable from the hook. The eye 13 and casing sleeve 14 are preferably made integral with the stem 3 although they may be otherwise formed.

In operation, when it is desired to engage a ring or the like with the hook, the ring is passed through the mouth 7 and placed in the groove in the roller 8. The stem 3 is then moved inwardly to bring the groove in the roller opposite the notch 9 in the bill 8 of the hook, and the ring is then moved into the notch, whereupon the spring 15 returns the stem and roller to their normal position shown in Figs. 1 and 2 so that the ring drops into the main portion of the hook. When it is desired to remove the ring from the hook, the ring is placed in the notch 9 and the stem is then forced inwardly to bring the roller opposite the notch so that the ring may be shifted into the groove in the roller. When this has been done, the stem is released and the spring returns it to normal position whereupon the ring may be moved out of the mouth of the hook.

It will be noted that the simple construction of the device renders it strong and durable, that the action of the spring and roller render it self locking, and that the peculiar shape of the mouth and bill of the hook and the roller enable a ring, chain cable or the like to be quickly and easily engaged with and disengaged from the hook.

Slight changes in the form, proportion, and details of construction may be made within the spirit and scope of the invention as defined by the appended claims.

What I claim is:

1. The combination of a hook having its mouth on one side and a tubular shank at one end, a stem slidably and rotatably mounted in the shank and having at its inner end a longitudinally projecting pivot, a grooved roller mounted on said pivot to guard the mouth of the hook, and a spring for actuating the stem in one direction.

2. The combination of a hook having its mouth on one side and a bill formed on its inner face with a transverse notch, said hook also having a tubular shank at one end, a stem to slide and rotate in the shank, a grooved roller mounted on the inner end of the stem and movable between the mouth of the hook and the notch in the bill of the hook, a casing sleeve on the outer portion of the stem to telescope the shank, and a coil spring on the stem within the casing sleeve.

In testimony whereof I affix my signature in presence of two witnesses.

CHARLES W. OLSON.

Witnesses:
 GEO. W. VOGEL,
 H. SIVERSON.